(No Model.)
W. M. McDOUGALL.
ELECTRIC MOTOR FOR RAILWAY CARS.
No. 431,213. Patented July 1, 1890.
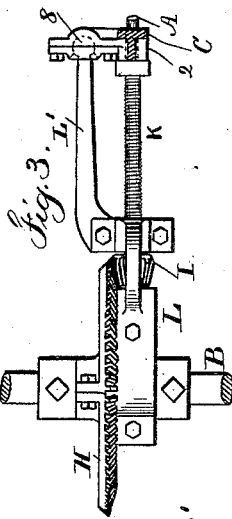
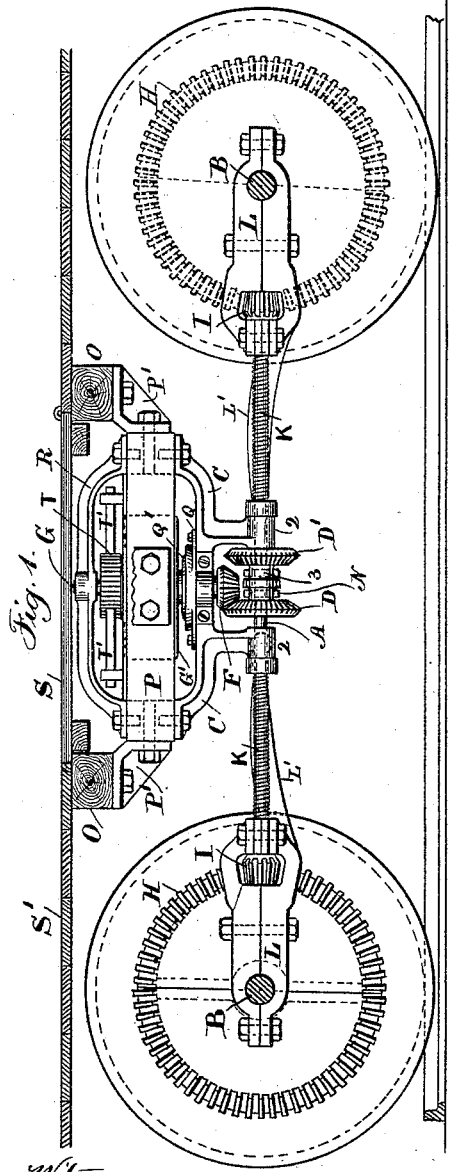
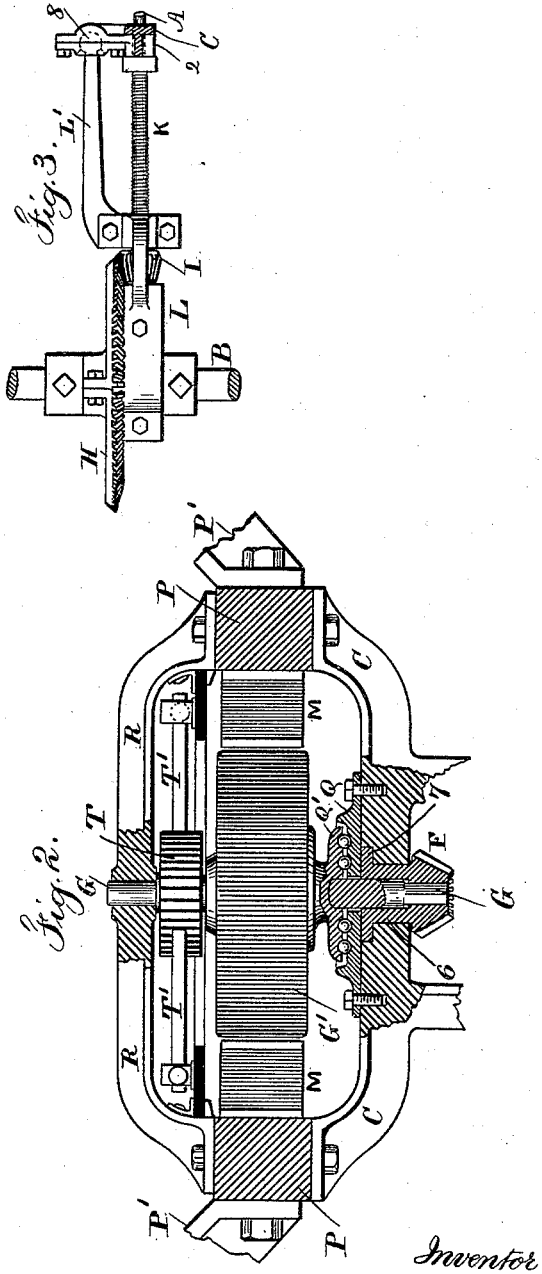
Witnesses
Chas H Smith
J. Staib
Inventor
William M. McDougall
per Lemuel W. Serrell
atty

UNITED STATES PATENT OFFICE.

WILLIAM M. McDOUGALL, OF EAST ORANGE, NEW JERSEY.

ELECTRIC MOTOR FOR RAILWAY-CARS.

SPECIFICATION forming part of Letters Patent No. 431,213, dated July 1, 1890.

Application filed May 16, 1889. Renewed May 22, 1890. Serial No. 352,706. (No model.)

*To all whom it may concern:*

Be it known that I, WILLIAM M. McDOUGALL, of East Orange, in the county of Essex and State of New Jersey, have invented an Improvement in Electric Motors for Railway-Cars, of which the following is a specification.

In electric motors for railway-cars difficulty has been experienced in removing the armature and shaft for repairs to the same or to the commutators, and this difficulty is increased in consequence of the small distance usually existing between the axle of the car-wheels and the under side of the car platform or floor.

My present invention is made for rendering the electric motor compact, so that the space occupied thereby is sufficiently small to allow the motor to be introduced below the floor of the car, with the armature-shaft in a vertical position, so that it may be easily removed for repairs, when necessary, without disturbing the field-magnets or the gearing connecting the armature-shaft with the driving-wheels of the car.

In the drawings, Figure 1 is an elevation, partially in section, of the motor and the gearing connecting the same to the axles of the car-wheels. Fig. 2 is a detached section, in larger size, showing the bearings for the armature-shaft; and Fig. 3 is a detached plan view of the gearing and frame extending from the motor-frame to the axle.

A reference is hereby made to my patent, No. 387,726, granted August 14, 1888, for a more full description of the construction of the frame L', extending from the yoke L, that grasps the axle B, and is united by a ball-joint 8 to the frame of the motor, and also for the flexible shaft K, connecting the pinion I with the motor, this pinion I being within the yoke L and gearing into the wheel H upon the axle B.

Instead of the flexible shaft K extending to the armature-shaft of the motor, as in said patent, it is coupled to the short shaft A, supported by bearings 2 upon the frame C of the motor, and between these bearings 2 there are bevel gear-wheels D D', connected together by a sleeve 3 and sliding upon a feather or key on the shaft A, so that either wheel D D' may be brought into contact with the pinion F upon the armature-shaft G. It is to be understood that the bevel gear-wheels D D' and sleeve 3 are slipped endwise upon the shaft A by any suitable lever and fork N, and that when the wheels D D' are equidistant from the bearings 2 they will be out of gear with the pinion F, and that when the wheel D is in contact with the pinion F the car will be propelled in one direction, and when the bevel-gear D' is in contact with the pinion F the car will be propelled in the other direction, the electric motor always revolving in one direction.

The electric motor is provided with field-magnets M, supported by the main frame P of the machine and the beams O of the car, there being brackets P' between the frame P and the beams O, and the frame C is bolted beneath the frame P.

The armature-shaft G passes into the pinion F, and in order to allow the armature G' and shaft G to be lifted out, it is preferable to form a square or key at the lower end of the shaft G, to connect the same to the pinion F, and this pinion F should have a tubular hub 6 and flange 7 within the frame C, for holding the pinion in position when the armature-shaft is withdrawn, and to lessen the friction I prefer to make use of a concentrically-grooved plate Q upon the frame C, and the similar plate Q', fastened upon the armature-shaft G, with steel balls in the concentric grooves for supporting the weight of the armature and lessening the friction. The upper end of the armature-shaft G is supported by a removable cross-bridge R, bolted to the main frame P, and having a central bearing for the armature-shaft, so that the armature-shaft and armature can be lifted out when this bridge R is unbolted and removed, and to facilitate this operation a trap S is provided in the floor S' of the car, so that by lifting or swinging the same aside access is given to the motor. The usual commutator-plates T and brushes T' are provided, and these, being at the upper end of the motor, are easy of access for cleaning or repairs by simply lifting the trap S. I remark that in cases where the bevel-gears D D' are sufficiently large the bearing for the lower end of the armature-shaft G might be below the pinion F, instead of being above the same.

I claim as my invention—

1. The combination, with the car wheels and axles, of a motor having a vertical armature-shaft and connections for securing the motor to the under side of the car-floor, and a removable bridge for supporting the upper end of the armature-shaft, a pinion at the lower end of the armature-shaft, and bevel gearing and connections between the pinion and the axle of the car-wheels, substantially as set forth.

2. The electric motor having a vertical armature-shaft, and frame and connections between the same and the floor of the car, in combination with the car wheels and axles, a pinion upon the armature-shaft, bevel-gears, a sleeve for connecting the gears, a shaft upon which the sleeve may be moved endwise, and a shaft and bevel-gearing extending to the axle of the car for rotating the same in either direction by shifting the bevel-gears and sleeve, substantially as set forth.

3. The combination, with the car wheels and axles and the connecting gearing, of an electric motor having a vertical armature-shaft, ball-bearings for supporting the armature and shaft, and a removable bridge and bearing for the upper end of the armature-shaft to allow the armature and shaft to be removed upwardly after taking off the removable bridge, substantially as set forth.

4. The combination, with the car wheels and axles, of an electric motor having a vertical shaft, supports for connecting the motor to the floor of the car, a trap in such floor to give access to the motor, and a removable bridge and bearing for the upper end of the armature-shaft, substantially as set forth.

Signed by me this 7th day of May, 1889.

W. M. McDOUGALL.

Witnesses:
   GEO. T. PINCKNEY,
   WILLIAM G. MOTT.